United States Patent Office 3,565,461
Patented Feb. 23, 1971

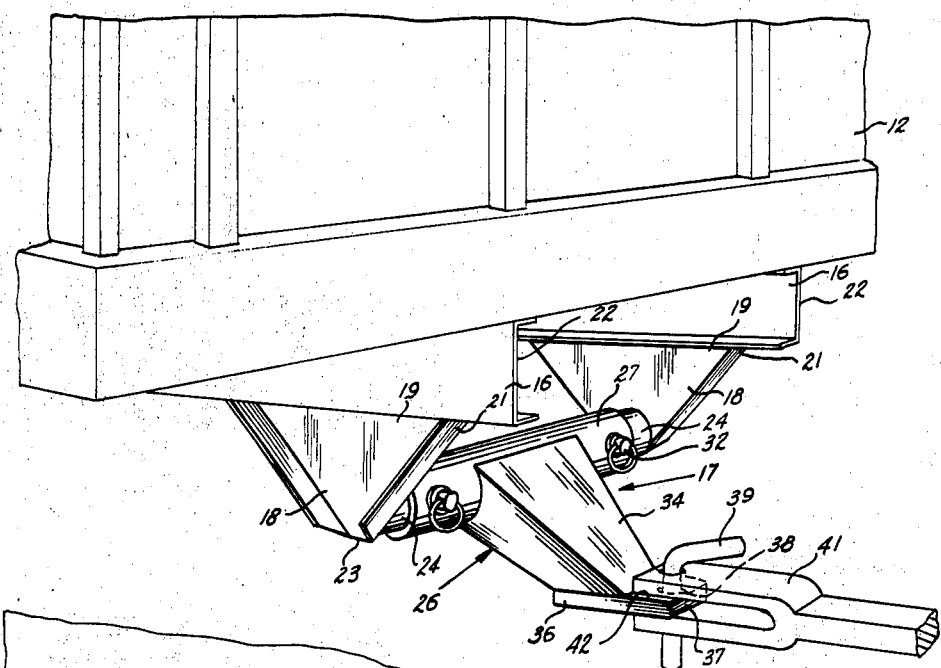
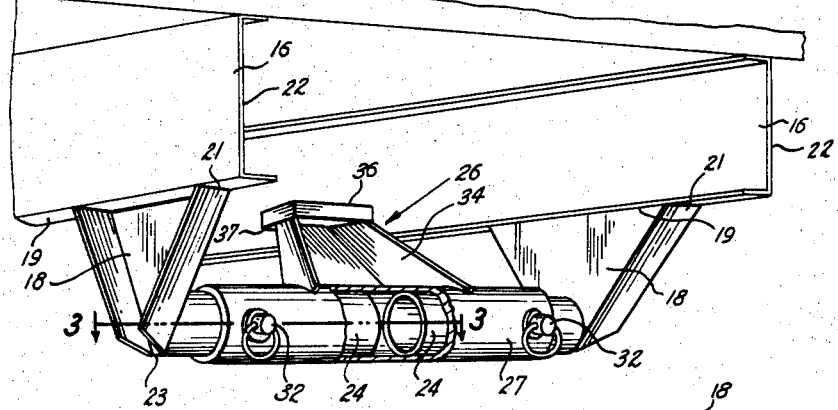
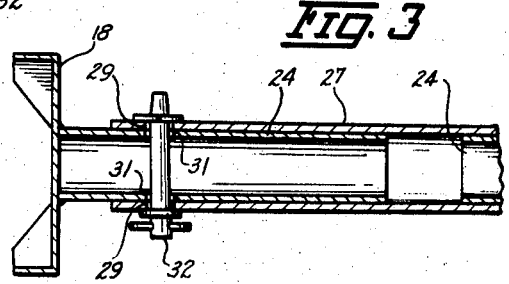
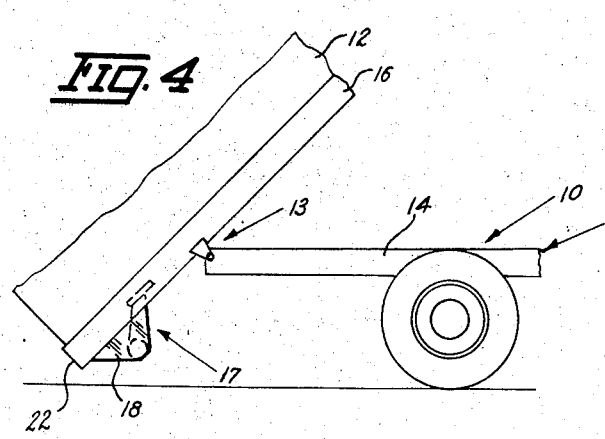

3,565,461
TRAILER HITCH
Eldon D. Jones, Lake Crystal, Minn. 56055
Filed Jan. 22, 1969, Ser. No. 793,103
Int. Cl. B60d 1/02
U.S. Cl. 280—491                        1 Claim

ABSTRACT OF THE DISCLOSURE

The trailer hitch is carried in a depending relation on and between a pair of longitudinal frame members of the towing vehicle at a position adjacent the rear ends of the frame members. The hitch includes a draw bar assembly that is rotatable about an axis extended transversely of the frame members to operating and storage positions therefor. In the operating position the draw bar assembly is inclined downwardly and rearwardly from its axis of rotation to locate a draw bar, that forms a part thereof, in a horizontal rearwardly projected position. When the draw bar assembly is in the storage position it is inclined upwardly and forwardly from its axis of rotation. The draw bar assembly is positively locked against rotation in each of its rotated positions.

SUMMARY OF THE INVENTION

The trailer or tow hitch is of a compact and rugged construction and is capable of being readily installed on the longitudinal frame members of the towing vehicle, or on the frame members of a dump body carried on the vehicle. The draw bar assembly of the hitch is rotatable through an angle of about one hundred and eighty degrees to an operating position wherein a draw bar is projected horizontally and rearwardly at a position below the frame members and adjacent the rear ends thereof at a level providing for its ready connection with the tongue of a towed vehicle. In its storage position the draw bar assembly is projected upwardly and forwardly between the frame members so as not to interfere with a normal use of the towing vehicle when the hitch is supported on the frame members of the vehicle, or with a normal use of the vehicle dump body, when the hitch is supported on the frame members of the dump body.

BRIEF DESCRIPTION OF THE DRAWING

Referring to the drawings,

FIG. 1 is a perspective view of the rear end portion of a dump truck with the tow hitch of this invention shown in its operating position;

FIG. 2 is a perspective view of the rear end portion of a dump truck with the tow hitch shown in its storage position;

FIG. 3 is a sectional view taken along the line 3—3 in FIG. 2; and

FIG. 4 is a diagrammatic showing of the body of the dump truck in a tilted position with the tow hitch in its storage position.

DESCRIPTION OF THE PREFERRED EMBODIMENT

With reference to FIG. 4 of the drawing, a towing vehicle 10 is illustrated as a dump truck of conventional type having a main frame 11 and a dump body 12 pivotally supported at 13 on the main frame for up and down pivotal movement. The frame 11 includes a pair of longitudinal frame members 14 (only one of which is shown) and the dump body 12 has a pair of longitudinal frame members 16 (FIG. 1) that are in resting engagement on the truck frame members 14 when the dump body 12 is in a transport position. A hoist mechanism (not shown) of a usual hydraulic type is interconnected between the frame members 14 and 16 for operation from the truck engine.

The tow hitch 17 of this invention (FIGS. 1 and 2) includes a pair of side mounting plates 18, each of which is of an inverted triangular shape having a base side 19 secured, as by welding, to the under side of a corresponding frame member 16 of the dump body 12. In this assembly, the rear corners 21 of the plate members 18 may be located five inches or less from the rear surfaces 22 of the frame members 16 for a purpose to appear later.

Each side mounting plate 18, at the apex or lower corner 23 thereof, has an inwardly extended stub shaft 24 (FIGS. 2 and 3) of a tubular construction. The stub shafts 24 are in axial alignment transversely of the beam members 16 with their inner ends axially spaced apart from each other. Rotatably supported on the stub shafts 24 is a draw bar assembly 26 that includes a tubular bearing member 27 having opposite end sections thereof rotatably mounted about the stub shafts 24.

As shown in FIGS. 1 and 2, the bearing member 27 is of a length less than the transverse distance between the side mounting plates 18 and adjacent each end thereof is formed with a pair of diametrically opposite holes 29 (FIG. 3). In turn each stub shaft 24 is formed with a pair of diametrically opposite horizontally extended holes 31 that are axially spaced a distance apart equal to the axial spacing between the pairs of holes 29 of the bearing member 27. Extendible through aligned pairs of openings 29 and 31 are locking pins 32 of a usual type, for locking the bearing member 27 against rotation relative to the stub shafts 24 at selected rotated positions thereof.

Projected radially from one side of the bearing member 27, and at the central portion thereof, is a supporting arm structure 34 (FIGS. 1 and 2) that is of a generally channel shape in transverse cross section tapered progressively inwardly from the inner to the outer end thereof. Rigidly secured to the outer end of the arm structure 34 is a draw bar 36 that extends transversely of the bearing member 27 and has an end section 42 (FIG. 1) projected laterally from the arm structure 34. The end section 42 is formed with a hole 38 to receive a coupling pin 39 for connecting the draw bar 36 with the tongue 41 of a trailing vehicle.

The arm structure 34 and side mounting plates 18 are relatively constructed so that when the bearing member 27 is locked against rotation in the operating position of the tow hitch 17, shown in FIG. 1 the draw bar 36 is horizontally extended at a distance of about fifteen inches below the underside of the beam members 16 and the section 37 is projected rearwardly from the arm structure 34 so as to locate the draw bar at a height for ready connection with trailer tongue 41. The location of the gear corners 21 of the side plates 18 within five inches or less of the rear surfaces 22 of the beam members 16 provides for the draw bar 36 being extended rearwardly with its end surface 37 vertically below or positioned rearwardly from the rear surfaces 22 of the beam members 16.

On disconnection of the coupling pin 39 from the trailer tongue 41 and removal of the locking pins 32 from the openings 29 and 31 the draw bar assembly 26 is rotatable upwardly and forwardly about the stub shafts 24 through an angular distance of one hundred and eighty degrees from its operating position shown in FIG. 1 to its storage position shown in FIG. 2 wherein the draw bar assembly 26 is projected upwardly and forwardly from the stub shafts 24. The locking pins 32 are then reinserted through aligned pairs of openings 29 and 31. In this storage position the draw bar assembly 26 is located between the side mounting plates 18 and the frame members 16 so as to be substantially concealed from view at a location above the tubular shafts 24.

As shown in FIG. 4, the storage position of the draw bar assembly 26 in no way interferes with the usual operation of the dump body 12 to a dump position. It will also be apparent that when the towing vehicle 10 is not provided with a dump body 12 that the tow hitch 17 may be carried on the frame members 14 of the main frame 11 in all ways similar to its installation on the frame members 16 of the dump body 12.

I claim:

1. A trailer hitch for effecting a connection between a trailer and a towing vehicle having a pair of spaced longitudinal frame members comprising:
   (a) a pair of transversely opposite mounting plates corresponding to said frame members, each mount plate secured to a frame member in a depending relation adjacent the rear end thereof,
   (b) a shaft means extended between and connected to the lower end portions of said mounting plates,
   (c) a draw bar assembly including a tubular bearing member rotatably mounted about said shaft means,
   (d) an arm structure secured at one end to said bearing member and extended radially therefrom for rotation with the bearing member to two rotated positions, therefor,
   (e) a draw bar fixed on the other end of said arm structure,
   (f) said arm structure in one rotated position of the bearing member being extended downwardly and rearwardly from said bearing member with said draw bar projected horizontally rearwardly therefrom, and in the other rotated position of the bearing member being extended upwardly and forwardly from said bearing member between said mounting plates,
   (g) means for locking said bearing member in said one or the other of the rotated positions therefor,
   (h) said bearing member rotatable one hundred and eighty degrees between the two rotated positions therefor, and
   (i) said locking means including a locking pin,
   (j) said shaft means having a diametrically extended opening therein in circumferential alignment with a pair of transversely opposite openings in said bearing member, the locking pin being insertable through said openings at each of said two rotated positions of the bearing member.

References Cited

UNITED STATES PATENTS

| | | | |
|---|---|---|---|
| 2,478,709 | 8/1949 | Riemann et al. | 280—491(.2) |
| 2,889,155 | 6/1959 | Sandage | 280—491(.2) |
| 3,298,744 | 1/1967 | Keim | 298—1X |

LEO FRIAGLIA, Primary Examiner

U.S. Cl. X.R.

198—1; 280—498